United States Patent

[11] 3,593,688

| [72] | Inventor | Voyd Lee Whitener<br>Indian River, Mich. |
|---|---|---|
| [21] | Appl. No. | 753,994 |
| [22] | Filed | Aug. 20, 1968 |
| [45] | Patented | July 20, 1971 |
| [73] | Assignee | U.S. Industries, Inc.<br>New York, N.Y. |

[54] ROLLUP POULTRY CAGES AND METHOD OF MAKING SAME
13 Claims, 3 Drawing Figs.

| [52] | U.S. Cl. | 119/17, 220/19 |
|---|---|---|
| [51] | Int. Cl. | A01k 31/06, A01k 31/08 |
| [50] | Field of Search | 119/17, 18, 19, 20, 21, 22; 220/19; 217/43; 140/107; 256/32 |

[56] References Cited
UNITED STATES PATENTS

| 2,052,774 | 9/1936 | Kundert | 256/32 |
| 2,814,326 | 11/1957 | Washabaugh | 140/107 X |
| 597,214 | 1/1898 | Douglas | 119/17 |
| 969,285 | 9/1910 | Keipper | 119/17 |
| 1,212,771 | 1/1917 | Holland | 119/17 |
| 1,973,952 | 9/1934 | Golberg | 119/17 |

*Primary Examiner*—Hugh R. Chamblee
*Attorney*—Price, Heneveld, Huizenga & Cooper ABSTRACT: A poultry cage assembly made by arranging long panels or sections of cage wall stock as wire mesh or the like in flat planar form, with a side edge of each such section or panel directly adjacent that of another such panel, securing such panels together along such adjacent side edges, and rolling the interconnected panels along an axis perpendicular to their length to form a generally cylindrical bundle for shipping, storage, and the like.

PATENTED JUL 20 1971

3,593,688

INVENTOR.
VOYD LEE WHITENER
BY *Price, Heneveld*
*Huizenga & Cooper*
ATTORNEYS

ROLLUP POULTRY CAGES AND METHOD OF MAKING SAME

BACKGROUND

For the most part, it is conventional practice at the present time to erect confinement cages for poultry in long cage rows which are divided into numerous laterally adjacent, separate cage units by spaced partitions or divider elements. The cage rows themselves are typically made of wire mesh material provided in individual elongated panels, with one such panel typically forming a segment in one of the wall sections of the cage row, i.e., the top, front, rear, or floor, between which the aforementioned partitions or dividers are transversely secured in place.

The storage and shipping of the numerous matched sets of individual mesh panel sections required to form complete cage rows of the aforementioned nature requires a considerable amount of space, as may readily be appreciated. Space requirements become particularly demanding when shipping is accomplished via truck, since, while the mesh panels can be stacked atop each other, the stacks so produced are cumbersome and unstable, and do not lend themselves to convenient or compact arrangement within a confined space such as the bed of a truck or the like, and they therefore waste a considerable amount of the available space. Further, assembling these panel sections and erecting long rows of poultry cages from them is time consuming and expensive in terms of the labor required.

SUMMARY

In accordance with the present invention, a new and unique method is provided for assembling poultry cage parts with a shape particularly adapted for storage and shipping, which shape lends itself exceedingly well to vertical stacking and also to a manual handling.

In accordance with the invention, elongated sections of poultry cage wall stock are rolled up into generally cylindrical bundles for shipping; preferably, the panels or sections of cage wall stock are assembled together in a pattern comprising a layout development of a complete poultry cage prior to being rolled up in the aforementioned manner. Thus, in accordance with the invention, the rolled bundles may be stacked on their ends or may be piled like logs for shipping and storage, to completely fill an allotted space if necessary, with practically no real danger of sliding or other such instability.

DRAWINGS

PREFERRED EMBODIMENT

Figure 1:
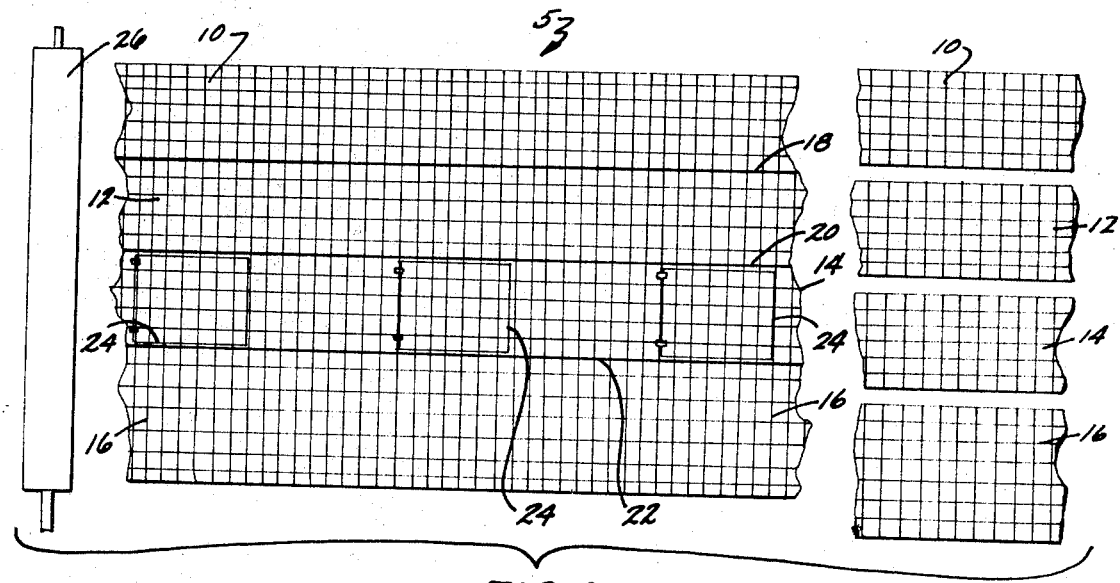
FIG. 1 is a fragmentary overhead plan view illustrating the overall nature of the manufacturing process.

In accordance with the present invention, the cage wall stock of wire mesh or the like may be provided in very long panels such as are seen at 10, 12, 14, and 16. These panels may initially be mutually independent, comprising sheetlike members of flat stock which may be manufactured elsewhere, or which may advantageously emanate directly from the point of their final manufacture, either as discreet pieces or as a generally continuous or extremely elongated section. In FIG. 1, the supply of the panels is taken as being at the right of the figure, with the panels moving toward the left during their manufacture or assembly into poultry cages.

Although initially supplied as mutually distinct or independent components, the panels of cage wall stock are moved into laterally adjacent and mutually contiguous alignment (shown at the center of FIG. 1) and they are secured together along the laterally adjoining edges such as 18, 20 and 22. Preferably, these edges are secured in a hinging manner such that the panels are mutually pivotable, at least to a limited extent, as for example by the use of the ringlike wire fasteners known as "hog rings."

Figure 2:
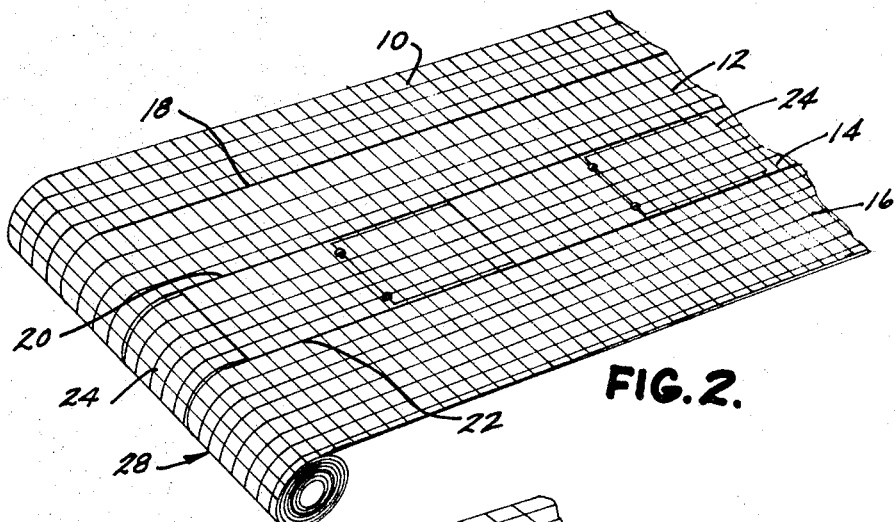
FIG. 2 is a fragmentary perspective view showing the layout development being rolled.

At the time when such interconnection of such panels is done, a plurality of generally rectangular partitions or divider elements 24 are laid down upon the upward surface of panel 14 (FIG. 1) in mutually spaced relationship and secured to this panel in the same generally pivotal manner just noted. Following this assembly of the various cage wall panels, the mutually interconnected panels and the attached divider partitions 24 are all wound or rolled as a unit as on an elongated roller means 26 (FIG. 1), to form a generally cylindrical rolled-up cage assembly 28 (FIG. 2) for storage, shipment, and the like.

Figure 3:
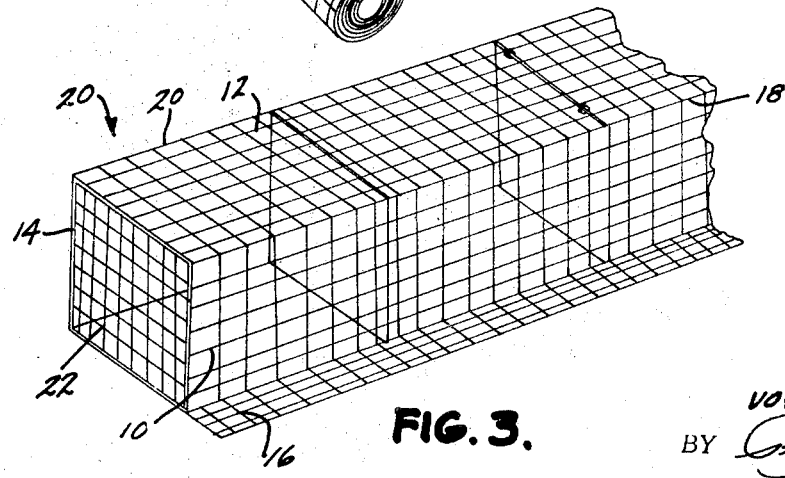
FIG. 3 is a fragmentary perspective view showing an unrolled and assembled cage row ready for use.

Prior to being rolled in the manner just noted, the assembled and interconnected cage wall panels 10, 12, 14 and 16, with the attached divider elements 24, together form a generally flat pattern which comprises a layout development of a complete poultry cage, i.e., all of the elements necessary to from a poultry cage enclosure are arranged in a flat, planar, pattern. Following storage and shipment in the cylindrical rolled-up form indicated at 28, the rolled assembly is unrolled to once again form the flat layout pattern mentioned previously, so that the cage enclosure to be ultimately provided by the assembly may be formed. The manner of forming this enclosure is as follows: the rolled-up assembly 28 is unrolled at the point where the cage enclosure is to be used, thereby restoring the interconnected panels back to their flat pattern form seen at 5 in FIG. 1. The panels are then hinged or angularly displaced from each other along their laterally adjoining and connected edges 18, 20 and 22, to thereby form an elongated enclosure of generally rectangular cross section (FIG. 3). The divider elements 24 are then swung outwardly away from the panel to which they are attached (illustrated as panel 14), such that they extend transversely across the elongated enclosure 30, dividing it into a plurality of mutually distinct cage units. The divider elements are secured in this position as by wire ring connectors, and the cage enclosure is substantially completed. Following this, the enclosure can be mounted in an elevated or suspended position in a typical manner, with automatic feeding equipment and watering equipment mounted to its front panel, i.e., panel 10. As illustrated in the figures, the bottom panel or floor 16 may be wider than the top 12, so that when the cage enclosures 30 are formed into the shape in which they are to be actually used, a portion 16' of the floor will project outwardly beyond the front wall 10, for use as an egg collection tray.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration and is in no way intended to illustrate all possible forms of the invention.

The embodiments of the invention in which I claim an exclusive property or privilege are defined as follows.

1. A method of manufacturing poultry cases, comprising the steps: providing generally flat cage wall stock of at least moderate flexibility in sheetlike form; arranging said stock in a predetermined generally flat pattern comprising a layout development of at least a part of a poultry cage; said arranging step including the placing in a predetermined relative relationship of cage top portions, cage front wall portions, cage rear wall portions, and cage floor portions; and convolutely rolling said patterned stock into a compact bundle of overlapping cross section, for storage, shipment and the like.

2. The method of claim 1, wherein said cage portions are separate panels of cage wall stock and said arranging step comprises the placing of said panels in mutually adjacent juxtaposition.

3. The method of claim 2, wherein said arranging step further comprises mutually interconnecting at least some of said separate panels.

4. The method of claim 3, wherein said interconnecting step comprises the forming of pivoted tying joints between adjacent panels, along the edges thereof.

5. The method of claim 2, wherein said arranging step further comprises the placing of sidewall divider elements in predetermined relation along certain of said panels.

6. The method of claim 5, wherein said arranging step further comprises mutually interconnecting at least some of said separate panels.

7. The method of claim 6, wherein said arranging step includes connecting said divider elements to certain of said panels.

8. The method of claim 1, wherein said cage wall stock is provided in long individual panels, wherein said panels are arranged in a generally coplanar side-by-side relationship, and wherein sidewall divider elements are placed atop at least one of said panels at spaced intervals therealong.

9. The method of claim 8, wherein at least some of said panels are mutually interconnected.

10. The method of claim 9, wherein said divider elements are secured in their said placement.

11. As an article of manufacture, a poultry cage assembly comprising: a plurality of panels of cage wall stock joined together along mutually adjacent edges; said panels including a cage floor panel, a cage rear wall panel, a cage top panel, and a cage front wall panel; said stock having at least a moderate degree of bending flexibility and being formable into a rectangulated poultry cage enclosure; said joined panels initially having a flat sheetlike configuration by being together rolled upon themselves convolutely into a generally cylindrical bundle for storage and shipment.

12. The cage assembly of claim 11, including tying joint means pivotally interconnecting said panels along their adjacent edges.

13. The cage assembly of claim 11, further including a plurality of sidewall divider elements secured in place to at least one of said panels.

Big D P-407
S.N. 753,994

PO-1050
(5/69)

UNITED STATES PATENT OFFICE
CERTIFICATE OF CORRECTION

Patent No. 3,593,688                Dated    July 20, 1971

Inventor(s) Voyd Lee Whitener

It is certified that error appears in the above-identified patent and that said Letters Patent are hereby corrected as shown below:

Column 2, line 64:

the word "cases" should be changed to the word ---cages---.

Column 4, line 12:

the word "by" should be changed to the word ---but---.

Signed and sealed this 18th day of January 1972.

(SEAL)
Attest:

EDWARD M. FLETCHER, JR.      ROBERT GOTTSCHALK
Attesting Officer               Acting Commissioner of Patents